United States Patent [19]

Ricò

[11] 4,412,883

[45] Nov. 1, 1983

[54] VERY THICK SHAPED LAMINATED PLASTIC

[75] Inventor: Tiziano Rizó Parma, Italy

[73] Assignee: Salvarani S.p.A., Italy

[21] Appl. No.: 287,634

[22] Filed: Jul. 28, 1981

[30] Foreign Application Priority Data

Aug. 8, 1980 [IT] Italy ............................... 24066 A/80

[51] Int. Cl.³ .......................... B29C 19/00; C09J 5/02; B28B 9/00
[52] U.S. Cl. .................................... 156/222; 156/245; 156/307.7; 156/312; 264/241; 264/322
[58] Field of Search ............... 156/196, 212, 222, 245, 156/331.1, 327, 307.4, 307.7, 228, 306.9, 312; 264/241, 265, 322, 320, 327, 258, 112

[56] References Cited

U.S. PATENT DOCUMENTS

| | | | |
|---|---|---|---|
| 3,382,124 | 5/1968 | Briskey | 156/212 |
| 3,423,267 | 1/1969 | Munk | 264/112 |
| 3,615,982 | 10/1971 | Baudremer | 156/212 |
| 4,093,482 | 6/1978 | Ogata et al. | 156/196 |
| 4,185,069 | 1/1980 | Smith et al. | 156/322 |
| 4,268,468 | 5/1981 | Esper et al. | 156/245 |

*Primary Examiner*—Edward C. Kimlin
*Assistant Examiner*—Louis Falasco
*Attorney, Agent, or Firm*—Stevens, Davis, Miller & Mosher

[57] ABSTRACT

The invention relates to a process for the production of a very thick, self-supporting, Z-shaped plastic laminate, starting from a plurality of Kraft papers imbued with phenolic resin, possibly with a superposed sheet of decorative paper imbued with melaminic resin, said papers being pressed in two successive processing phases; in the first phase the pressure is kept at a minimum level, while the temperature of the papers rises up to the temperature of polymerization of the resins, and in the second phase the temperature keeps at a substantially constant level while the pressure rapidly increases, at least initially.

8 Claims, 5 Drawing Figures

VERY THICK SHAPED LAMINATED PLASTIC

BACKGROUND OF THE INVENTION

1. Field of the Invention

The present invention relates to a process for the production of a very thick, shaped, "laminated plastic", as well as to a machine for carrying out said process, and the product obtained thereby.

2. Description of the Prior Art

Laminated plastic is nowadays a product which is widely spread on the market. For producing the same, some sheets of Kraft paper weighing 100–150 g/sq.m., imbued with phenolic resin and, usually, at least one sheet of decorative paper weighing 100–120 g/sq.m., imbued with melaminic resin, are laid one upon the other and this pack of sheets is hot-pressed up to full polymerization of the resins.

One thereby obtains a flat sheet, actually called "laminate" owing to its characteristics of resemblance to a thin foil of high superficial hardness, resistance to stresses and sufficient flexibility.

Such plastic laminates are actually produced in different thicknesses, generally between six tenths of a millimeter and fourteen to sixteen tenths of a millimeter, and they have the desired flexibility—in spite of their hardness and strength—thanks to the very fact that their thickness is so reduced.

The plastic laminates produced at present have the outer surface showing the most varied decorative effects. If the superficial decorative sheet is of light colour, a sheet of barrier paper is usually interposed between the same and the underlying sheets of Kraft paper, so as not to let through the dark colour of said Kraft paper sheets.

The most widespread use of these plastic laminates is in carpentry, for lining furniture, particularly—but not exclusively—kitchen furniture, due to the actual characteristics of hardness and of resistance to wear of their surface.

By making full use of these characteristics it is in fact possible to obtain highly strong and long lasting furniture, even starting from panels of pressed shavings, instead of wooden panels, since plastic laminate, applied on the whole surface of the panel, is apt to give to this latter also a structural strength.

According to the most known technique, plastic laminate is cut to size and applied (glued) on each of the surfaces of the wooden panel, and trimmed along the edges. This technique suffers however from some drawbacks:

to start with, it is a relatively expensive technique, with great employment of labour for the work of cutting to size, of gluing the laminate onto the panel and of trimming the edges;

moreover, due to the fact that kitchen furniture is particularly subjected to strong humidity and to frequent wetting, it may easily happen, after a relatively short period of use, that the laminate becomes unglued from the panel;

finally, due to the modest flexibility of the laminate, even where its thickness is very reduced, it is impossible to line therewith surfaces having an emphasized curvature.

To eliminate these drawbacks at least partly, it has already been proposed to produce "post-forming" laminates. They are flat laminates, substantially similar to those described hereabove, but wherein the polymerization of the resins (under pressure and heat) is not completed. These laminates may then be subjected—at a moment subsequent to their formation and therefore even just before they are applied—to a bending operation, so as to acquire even small bending radiuses, for instance of 15 to 20 mm.

This technique hence allows for instance to line, with a single piece of laminate, the major surface of a wooden panel and the surface of one side being connected thereto through a rounded chamfering. One thereby obtains, in addition to a special aesthetical effect, a protection of the edge joining said two surfaces, since in correspondence of that point, the lining has no interruptions.

The advantage obtained with post-forming laminates is however relatively modest:

to start with, because in a furniture panel—as for instance the rest or working surface of a piece of kitchen furniture—there are at least eight long edges, only two of which may eventually be protected in the aforespecified manner;

furthermore, because the surface of the post-forming laminate is less resisting to wear or to cutting in that, as said, the polymerization of the resins is not complete.

SUMMARY OF THE INVENTION

The object of the present invention is a process for the production of a very thick, shaped, plastic laminate, and the product thereby obtained, which entirely eliminates the above drawbacks, while achieving other important and unexpected advantages.

Said process is actually characterized in that:

a pack of at least thirty Kraft papers imbued with phenolic resin is formed, said pack is laid onto a first part of a mold, shaped with bending lines parallel to a main axis of said mold, the sheets being seamed one onto the other at least along one of the edges parallel to said main axis, and the mold is closed according to a diagram of pressures which comprises at least an initial closing and preheating phase, under a minimum constant pressure and with a rising temperature of the pack of papers, and a second processing phase at a substantially constant temperature and with an increasing closing pressure.

Moreover, according to the invention, the plastic laminate produced presents itself with a uniform thickness exceeding approx. 5 mm. and with an essentially Z-shaped cross section, the central branch of the Z being perpendicular to the end branches and considerably longer than these latter.

As confirmed by practise, the process according to the invention enables first of all—in the initial phase, in which the pressure is very slight and the gradually rising temperature causes the softening of the resins—an effortless sliding of the pack sheets one in respect of the other, essentially in a direction perpendicular to the main axis of the mold, so that they gradually and easily adapt themselves to the shaped profile of the mold; it hence allows, in the subsequent processing phase, to perform the pressing and the final polymerization of the resins when the accomodation of the sheets into the shaped mold has already been totally reached.

The product obtained according to the invention, namely a very thick shaped laminate, provides on the other hand essentially new characteristics especially owing to the fact that, in the specified thickness—which may even easily reach 7 to 9 mm.—it acquires a structural rigidity whereby it is no longer used as lining for a wooden support panel, but it performs itself the function of a load bearing panel with an already finished surface.

BRIEF DESCRIPTION OF THE DRAWINGS

Further characteristics and advantages will anyhow result more evident from the following detailed description, given with reference to the accompanying drawings, in which.

DESCRIPTION OF THE PREFERRED EMBODIMENT

Figure 1:
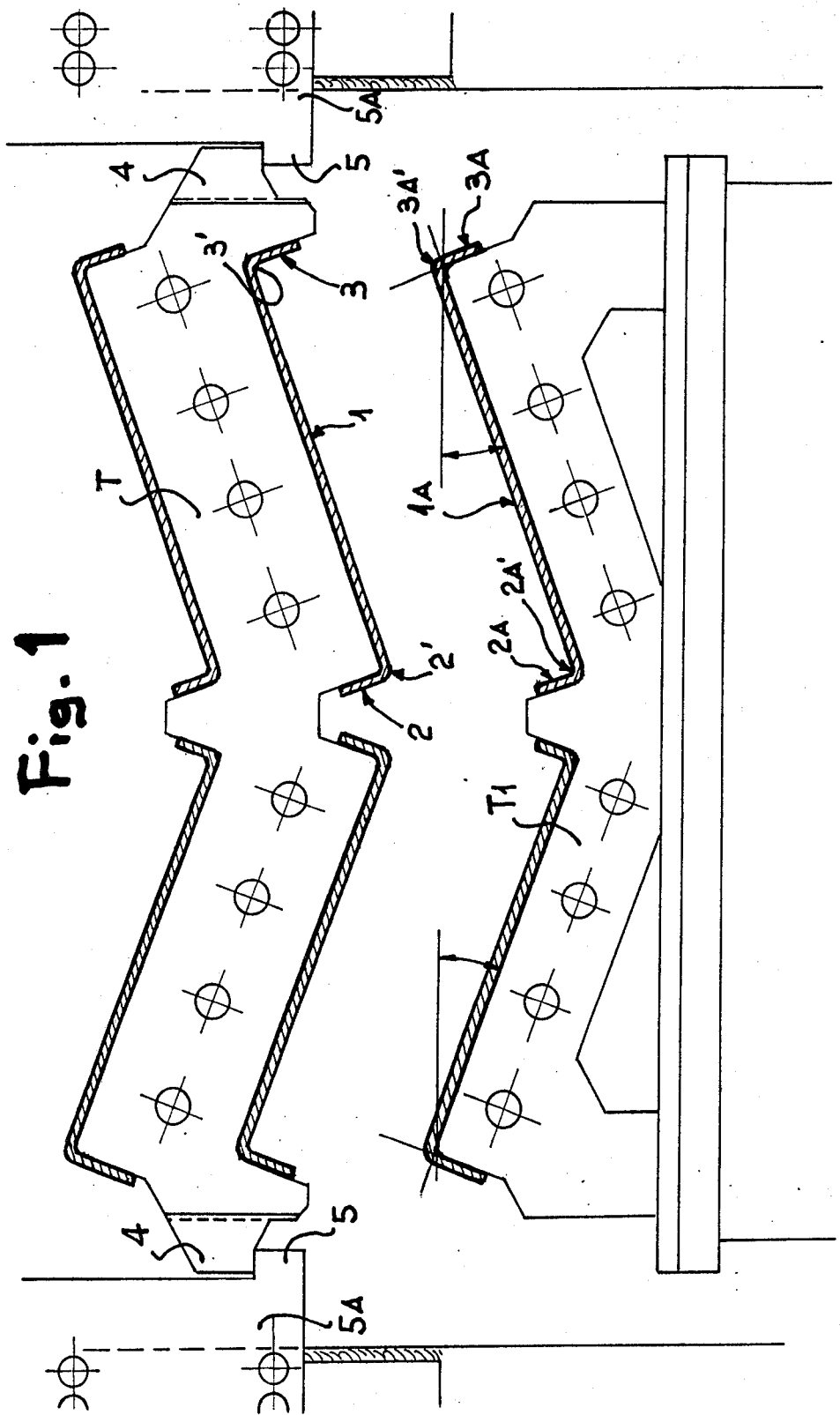
FIG. 1 is a schematic cross section view of a mold for pressing a laminate according to the invention.

As shown in FIG. 1, each mold is formed by a pair of flat slanting walls 1, 1A—inclined about 20° in respect of the horizontal plane, or by 70° in respect of the vertical direction of closing the mold and of imparting the pressure—each wall 1, 1A extending into two sides 2, 3 and 2A, 3A, bent by 90° in respect of said walls, in opposite directions. Said sides are thus inclined by 20° in respect of said vertical plane.

The bending lines or corners 2', 3' and 2A', 3A' of the sides, run parallel to a longitudinal, main axis of the mold. The bending lines 2' and 3A'—being apt to form innet corners of the laminate—have bending radiuses of not less than 5 mm., while the bending lines 3' and 2A'—being apt to form outer corners of the laminate—have bending radiuses of not less than 5 mm. plus the thickness of the finished laminate, formed inside the mold: thus, in the case of a 7 mm. laminate, the bending radius will be not less than 12 mm..

Preferably, the two opposed surfaces 1, 2, 3 and, respectively, 1A, 2A, 3A, of the mold, are obtained with a bent plate, for instance 3 mm. thick, bearing onto a rigid carrying structure of the mold, not described in detail.

According to a preferred embodiment, in the same press several pairs of molds are mounted, side-by-side in twos—in the manner shown in FIG. 1—and even superposed. As shown in FIG. 1, the crosspiece T, on the lower part of which are applied the molding plates 1, carries at the top the molding plates 1A of another pair of superposed molds. The intermediate crosspiece T is lifted from the base crosspiece T1 thanks to the fact that its lateral teeth 4 bear onto shoulders 5 of slides 5A which slide vertically under the control of hydraulic drive.

According to the invention, a hot/hot pressing cycle is preferably adopted; in other words, the temperature of the plates 1, 1A, is constantly kept at the rate required for the polymerization of the resins, usually around 145° C. The finished laminate is drawn out of the mold—for instance by sliding it lengthwise, after opening the molds—and soon after, a new pack of treated Kraft papers is laid onto the plates 1, 1A.

Figure 2:
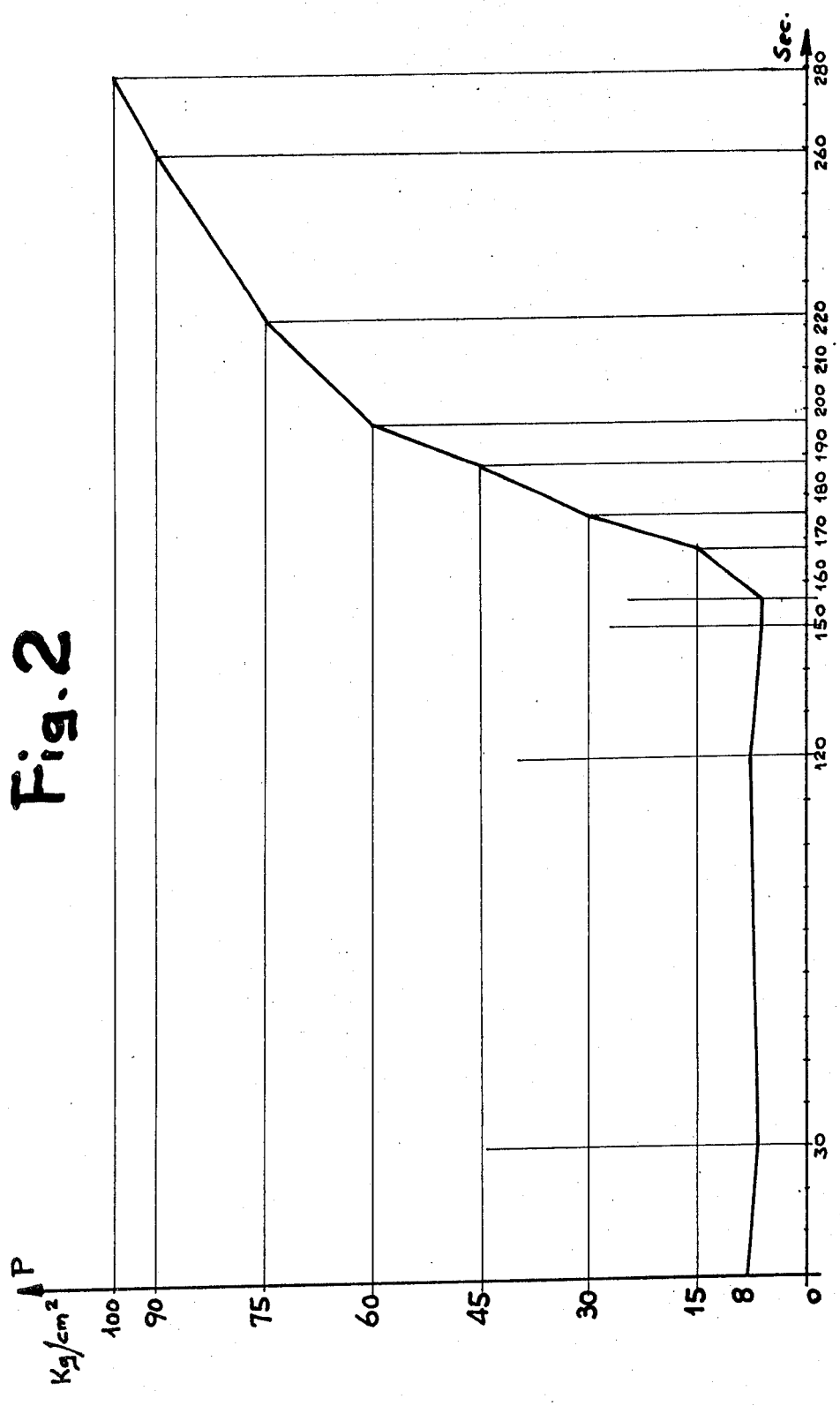
FIG. 2 is a graph of the development of the pressures, in respect of time, in a pressing process according to the invention.
Figure 3A:
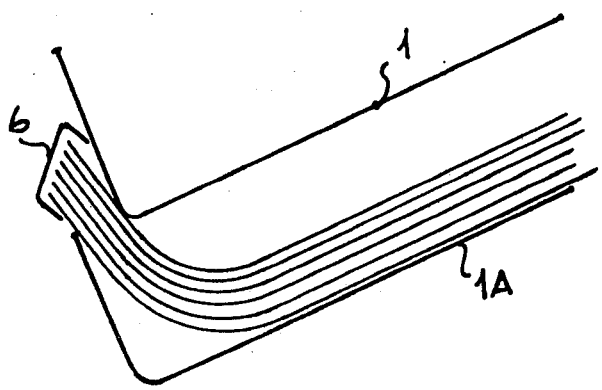
FIGS. 3A to 3C show, on an enlarged scale, a detail of the pressing mold in successive processing phases.
Figure 3B:
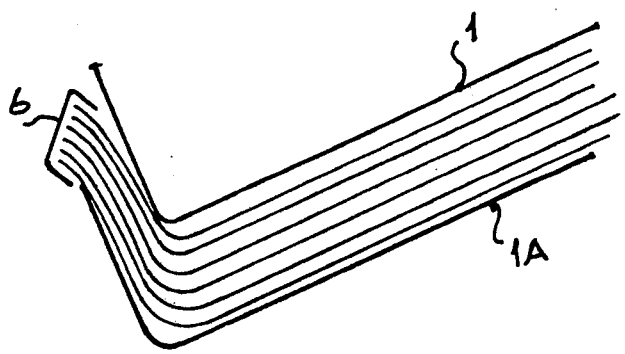
Figure 3C:
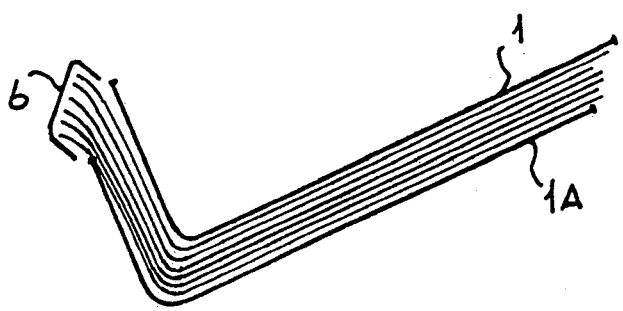

For the mold pressing operation, one proceeds as follows:

(a) one prepares first of all a pack of Kraft papers—for instance 40 to 50 Kraft papers weighing 160 g/sq.m.—all of equal dimensions and superposed. These papers are held one on top of the other in a very light manner, for instance by strips of adhesive tape 6, arranged in the manner shown in FIG. 3, along the longitudinal edges of the sheets, namely along the edges running parallel to the corners 2', 3', 2A' and 3A';

(b) a pack thus formed is introduced, as said, between the plates 1, 1A, of each mold, soon after having drawn out the previously finished laminate. In this phase, the mold is constantly kept at its working temperature, for example of 145° C., corresponding to the temperature of polymerization of the resins. In laying the pack onto the mold, the sheets shortly and freely slide one onto the other in the transversal sense—thanks to the retaining action of the strips 6 of adhesive tape, applied onto the longitudinal edges—so that the pack of papers naturally disposes itself in the manner shown in FIG. 3A;

(c) one starts at this point the first phase of closing of the molds and of preheating (instant O of the graph of FIG. 2), under a very slight pressure. This pressure is kept at a constant minimum rate, for instance below 8 Kg/sq.cm., throughout the first phase of the pressing process. In fact, during this phase—in which the Kraft papers are gradually heated up to the softening temperature and then the temperature of polymerization of the resins—the slightest pressure imparted by the mold enables the pack to acquire very gradually the shape of the Z profile of the mold, preventing in particular that an exceedingly swift and definite pressure action may produce cracks in the papers or even breaking thereof—in correspondence of the corners of the mold, said papers being initially fairly stiff. This initial phase is relatively short and it lasts for about 150 sec. according to what is indicated by the graph of FIG. 2. However, it may last less—when the number of the Kraft papers employed or their weight are below the aforespecified values—or it may even last longer, especially with papers weighing exceeding 160 g/sq.m., which are considerably stiffer;

(d) at the end of this first phase, the pack of Kraft papers has reached the processing temperature and has bent according to the exact profile of the mold (see FIG. 3B), this latter being now considered practically closed. A second processing phase starts at this point, for the true and proper mold pressing; in this phase, the pressure is initially increased in a very rapid way, for instance up to 60 Kg/sq.cm. in less than 50 sec., in order to obtain a final settlement of the papers when the resins are perfectly softened, but their polymerization has not yet started. The pressure then continues to increase more gradually—for instance in another 80 to 100 sec.—up to the final rate of 100 Kg/sq.cm., which anyhow depends on the technical characteristics of the resin employed for imbuing the Kraft papers;

(e) once the final pressure has been reached—in a total length of time indicated as being 280 sec. in the graph of FIG. 2—the pressure and the temperature are held constant—for the final polymerization, or "baking" of the resins—for a length of time of about twenty minutes. The laminate so acquires its final shape (see FIG. 3C), and at the end of the polymerization it can be drawn out of the mold, trimmed along the edges according to the line X—so as to be brought to its final size, or to eliminate the end part of the papers which has remained externally to the mold and hence not polymerized—and placed to cool down flat, out of the mold, at room temperature.

A thick laminate thus produced shows, in use, highly worthy technical characteristics:

- its surface is hard and resisting to abrasion, to cutting, to heat and to humidity, even more than the thin sheets of the usual covering laminates;
- it possesses a remarkable rigidity of its own, also on account of its Z section, so as to be able to perform support functions.

For these characteristics, the laminate according to the invention may be successfully employed for instance as covering and working surface for kitchen furniture, without requiring any other wooden supporting layer, and more particularly, with no fear of water seeping through below. Its structural rigidity allows in fact to use it not only as a covering element, but as a true and proper carrying, connection and stiffening element for the whole structure of the furniture piece.

The use as working surface for kitchen furniture is anyhow merely indicative, since such a laminate according to the invention lends itself very successfully for different uses in the housefurnishing field and even in the building field.

I claim:

1. A process for the production of a very thick, shaped, plastic laminate from sheets of Kraft paper weighing between 120 and 200 g/sq.m. imbued with phenolic resin, comprising forming a pack of at least thirty parallel dimensionally equal superposed Kraft papers imbued with phenolin resin, laying said pack onto a first part of a mold, shaped with bending lines of from 5-14 mm parallel to a main axis of said mold, and closing said mold according to a diagram of pressures which comprises at least a first closing and preheating phase, said mold being held at a constant temperature while the temperature of the pack of Kraft papers rises up to the temperature of polymerization of the resins whereby said resin is softened but polymerization has not yet started, the pressure in said first closing and preheating phase being kept at a rate below 8 kg/sq.cm., and a second processing phase at a substantially constant temperature with thereafter polymerizing a clamping pressure increasing from 8 kg/sq. cm. up to 100 kg/sq. cm.

2. The process of claim 1, wherein said pack includes a superficial sheet of decorative paper imbued with malamine resin superposed and hot-pressed.

3. The process of claim 1 or claim 2 wherein said pack consists of Kraft papers weighing 140 and 165 g/sq.m.

4. The process of claim 1 or claim 2, wherein said pack consists of 45 to 60 Kraft papers weighing 160 g/sq.m., for forming a laminate of a thickness of about 9 mm.

5. The process of claim 1 or claim 2, wherein the papers forming said pack are seamed along at least one of the edges parallel to said main axis of the mold.

6. The process of claim 1 or claim 2, wherein the pressure for closing the mold is imparted perpendicularly to said bending lines of the two mold parts.

7. The process of claim 1 or claim 2, wherein the mold clamping pressure increases very rapidly, through the initial part of the second processing phase, at least up to exceeding half of the final pressure rate.

8. The process of claim 7, wherein the pressure rapidly increases, through said initial part of the processing phase, up to at least 60 Kg/sq.cm.

* * * * *